(12) United States Patent
Mihara et al.

(10) Patent No.: US 8,853,609 B2
(45) Date of Patent: Oct. 7, 2014

(54) SOLID-STATE IMAGING DEVICE WITH MULTIPLEXED READ-OUT AND SHUTTER STATES

(75) Inventors: Takahiko Mihara, Kanagawa (JP); Motohiro Morisaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 274 days.

(21) Appl. No.: 13/419,638

(22) Filed: Mar. 14, 2012

(65) Prior Publication Data

US 2012/0305749 A1 Dec. 6, 2012

(30) Foreign Application Priority Data

May 30, 2011 (JP) ................................. 2011-120233

(51) Int. Cl.
*H04N 5/353* (2011.01)
*H04N 5/376* (2011.01)
*H04N 5/374* (2011.01)

(52) U.S. Cl.
CPC ............. *H04N 5/353* (2013.01); *H04N 5/3765* (2013.01); *H04N 5/3742* (2013.01)
USPC .................. 250/208.1; 250/214 R; 250/214.1

(58) Field of Classification Search
CPC ..... H01L 27/14; H01L 31/0232; H01L 31/09; H01N 3/15; H04N 5/335; G01J 1/44
USPC ........ 250/208.1, 214 R, 214.1; 348/296–311; 257/292, 293, 440
See application file for complete search history.

(56) References Cited

U.S. PATENT DOCUMENTS

2010/0201858 A1 8/2010 Nakano et al.
2010/0302421 A1* 12/2010 Nakano ......................... 348/296

FOREIGN PATENT DOCUMENTS

JP 2010-183435 8/2010
JP 2010-278648 12/2010

* cited by examiner

*Primary Examiner* — Georgia Y Epps
*Assistant Examiner* — Carolynn A Moore
(74) *Attorney, Agent, or Firm* — Oblon, Spivak, McClelland, Maier & Neustadt, L.L.P.

(57) ABSTRACT

According to one embodiment, a vertical selection circuit that sets an electronic shutter state and a read-out state in time division multiplexing for each selected row of a pixel array unit in which the pixels are arranged in a matrix pattern, a pulse selector circuit that drives the pixels belonging to the selected row in accordance with the electronic shutter state and the read-out state, and a timing generator circuit that controls operational timing of the vertical selection circuit and the pulse selector circuit are included.

19 Claims, 8 Drawing Sheets

SOLID-STATE IMAGING DEVICE WITH MULTIPLEXED READ-OUT AND SHUTTER STATES

CROSS-REFERENCE TO RELATED APPLICATIONS

This application is based upon and claims the benefit of priority from Japanese Patent Application No. 2011-120233, filed on May 30, 2011; the entire contents of which are incorporated herein by reference.

FIELD

Embodiments described herein relate generally to a solid-state imaging device.

BACKGROUND

According to conventional solid-state imaging devices, in a vertical selection circuit that sets an electronic shutter state and a read-out state within one horizontal scanning period for an imaging area, a circuit used for an electronic shutter operation and a circuit used for a read-out operation are separately configured, and accordingly, the circuit scale is large.

DETAILED DESCRIPTION

According to a solid-state imaging device of an embodiment, a pixel array unit, vertical signal lines, a vertical selection circuit, a pulse selector circuit, and a timing generator circuit are disposed. In the pixel array unit, pixels that store electric charge acquired through a photoelectric conversion are arranged in a matrix pattern. The vertical signal line transmits a pixel signal read out from the pixel in the vertical direction. The vertical selection circuit sets the electronic shutter state and the read-out state for each selected row of the pixel array unit in time division multiplex. The pulse selector circuit drives pixels belonging to the selected row in accordance with the electronic shutter state and the read-out state. The timing generator circuit controls the operation timing of the vertical selection circuit and the pulse selector circuit.

Hereinafter solid state imaging devices according to embodiments will be described with reference to the drawings. However, the present invention is not limited to such embodiments.

First Embodiment

Figure 1:
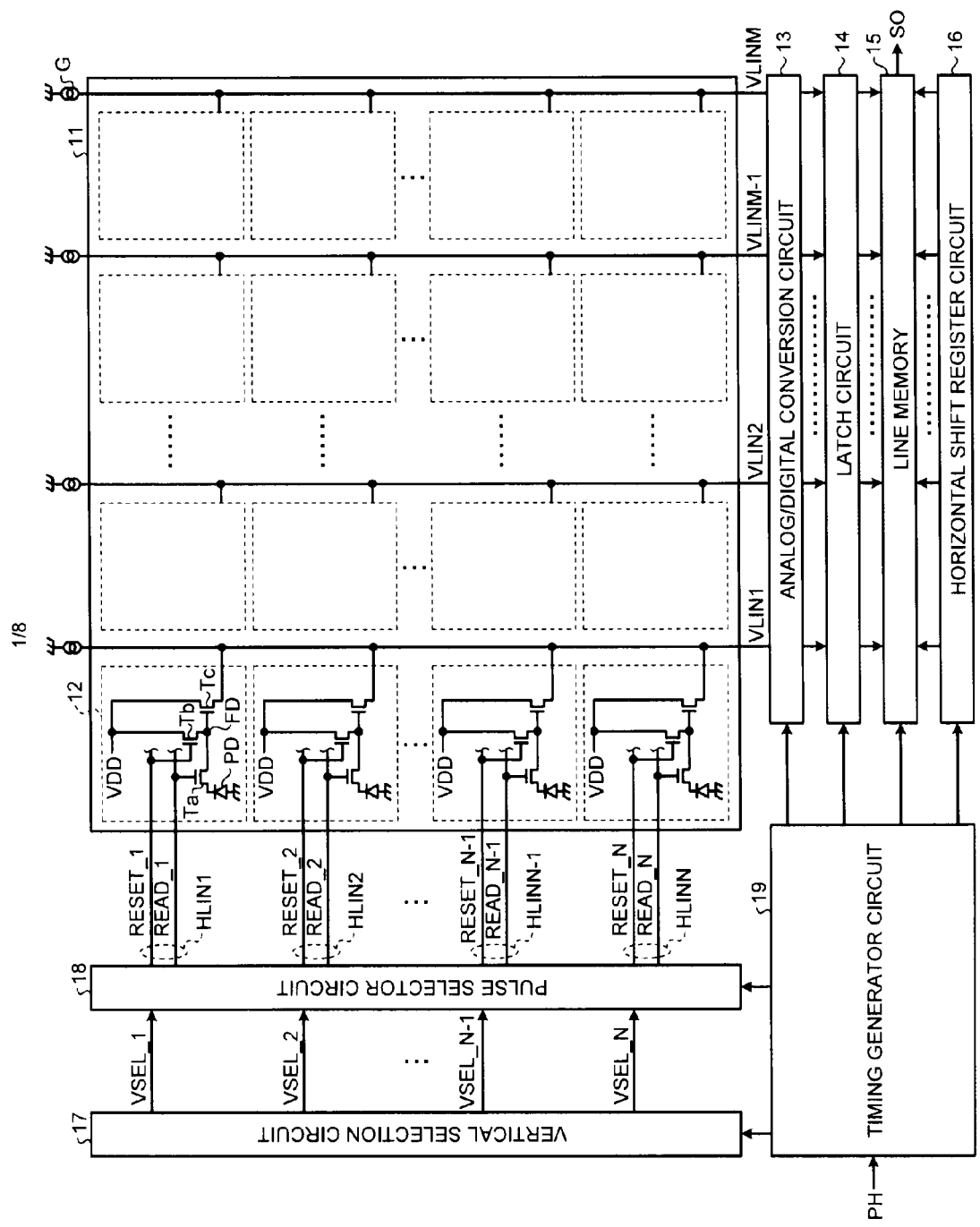
FIG. 1 is a block diagram illustrating a schematic configuration of a solid-state imaging device according to a first embodiment.

FIG. 1 is a block diagram illustrating a schematic configuration of a solid-state imaging device according to a first embodiment.

As illustrated in FIG. 1, in this solid-state imaging device, a pixel array unit 11 in which pixels 12 storing electric charge acquired through a photoelectric conversion are arranged in a matrix pattern in the row direction and the column direction, an analog/digital conversion circuit 13 that digitalizes a signal component of each pixel 12 through CDS, a latch circuit 14 that latches the signal component of each pixel 12 which has been digitalized by the analog/digital conversion circuit 13 and corresponds to one line, a line memory 15 that stores the signal component of each pixel 12, which is latched by the latch circuit 14 and corresponds to one line, a horizontal shift register circuit 16 that scans the pixel 12 as a read-out target in the horizontal direction, a vertical selection circuit 17 that sets the electronic shutter state and the read-out state for each selected row of the pixel array unit 11 in time division multiplex, a pulse selector circuit 18 that drives the pixels 12 of the pixel array unit 11, which belong to the selected row, in accordance with the electronic shutter state and the read-out state, and a timing generator circuit 19 that controls the timing of read-out and storage of each pixel 12 are disposed. In addition, a horizontal synchronization pulse PH is input to the timing generator circuit 19.

Here, in the pixel array unit 11, in the row direction, horizontal control lines HLIN1 to HLINN (here, N is a positive integer) used for controlling the read-out of the pixels 12 are disposed for each row, and, in the column direction, vertical signal lines VLIN1 to VLINM (here, M is a positive integer) used for transmitting signals read out from the pixels 12 are disposed for each column. In addition, current sources G that allow the electric potentials of the vertical signal lines VLIN1 to VLINM to follow signals read out from the pixels 12 are connected to the vertical signal lines VLIN1 to VLINM. Furthermore, the horizontal control lines HLIN1 to HLINN can be used for transmitting reset signals RESET_1 to RESET_N and read-out signals READ_1 to READ_N to the pixels 12 for each row.

In addition, in the pixel 12 positioned in the N-th row and the M-th column, a photodiode PD, a read-out transistor Ta, a reset transistor Tb, and an amplifier transistor Tc are disposed. Furthermore, at a connection point of the amplifier transistor Tc, the reset transistor Tb, and the read-out transistor Ta, a floating diffusion FD is formed as a detection node.

In addition, for example, in the pixel 12 positioned in the N-th row and the M-th column, the source of the read-out transistor Ta is connected to the photodiode PD, and a read-out signal READ_N is input to the gate of the read-out transistor Ta. Furthermore, the source of the reset transistor Tb is connected to the drain of the read-out transistor Ta, a reset signal RESET_N is input to the gate of the reset transistor Tb, and the drain of the reset transistor Tb is connected to a power source electric potential VDD. In addition, the source of the amplifier transistor Tc is connected to the vertical signal line VLINM, the gate of the amplifier transistor Tc is connected to the drain of the read-out transistor Ta, and the drain of the amplifier transistor Tc is connected to the power source electric potential VDD.

Furthermore, in the vertical selection circuit 17, a period TS in which the electronic shutter state is set, a period TR in which the read-out state is set, and a period TZ in which the detection node is electrically separated from the vertical signal lines VLIN1 to VLINM after the elapse of the read-out state are divided for each one of selected rows L1 to LN. Then, in each one of the period TS, TR, and TZ, row selection signals VSEL_1 to VSEL_N are respectively output from the vertical selection circuit 17 to the pulse selector circuit 18 in accordance with the selected rows L1 to LN.

Then, in the pulse selector circuit 18, in the period TS, reset signals RESET_1 to RESET_N are respectively applied to the reset transistors Tb in accordance with selected rows L1 to LN, and read-out signals READ_1 to READ_N are respectively applied to the read-out transistors Ta. As a result, the reset transistor Tb and the read-out transistor Ta are turned on, and the electric charge stored in the photodiode PD is discharged to the power source electric potential VDD through the floating diffusion FD. Subsequently, in the period TS, reset signals RESET_1 to RESET_N are respectively applied to the reset transistors Tb in accordance with selected rows L1 to LN, and the power source electric potential VDD is dropped to the ground electric potential once. As a result, the reset transistors Tb are turned on, and the electric potential of the floating diffusion FD is set to the ground electric potential through the reset transistors Tb, whereby the amplifier transistors Tc are turned off so as to electrically separate each pixel cell from the vertical signal lines VLIN1 to VLINM.

In the period TR, the reset signals RESET_1 to RESET_N are respectively applied to the reset transistors Tb in accordance with selected rows L1 to LN. As a result, the reset transistor Tb is turned on, and the electric potential of the floating diffusion FD is set to the power source electric potential VDD through the reset transistor Tb. Then, the reset levels at that time are read out so as to be applied to the vertical signal lines VLIN1 to VLINM through the amplifier transistors Tc and are transmitted to the analog/digital conversion circuit 13 so as to be held.

In addition, in the period TR, the read-out signals READ_1 to READ_N are respectively applied to the read-out transistors Ta in accordance with selected rows L1 to LN. As a result, the read-out transistor Ta is turned on, and the electric charge stored in the photodiode PD is transferred to the floating diffusion FD through the read-out transistor Ta. Then, the read-out levels at that time are read out so as to be applied to the vertical signal lines VLIN1 to VLINM through the amplifier transistors Tc and are transmitted to the analog/digital conversion circuit 13.

Then, in the analog/digital conversion circuit 13, by sampling the reset level and the read-out level from the signals of each pixel 12 and taking a difference between the reset level and the read-out level, the signal component of each pixel 12 is digitalized through CDS and is output as an output signal SO through the line memory 15.

In the period TZ, the reset signals RESET_1 to RESET_N are respectively applied to the reset transistors Tb in accordance with selected rows L1 to LN, and the power source electric potential VDD is dropped to the ground electric potential once. As a result the reset transistors Tb are turned on, and the electric potential of the floating diffusion FD is set to the ground electric potential through the reset transistors Tb, and accordingly, the amplifier transistors Tc are turned off, whereby the pixel cells are electrically separated from the vertical signal lines VLIN1 to VLINM.

Here, by performing time division multiplex of the period TS in which the electronic shutter state is set, the period TR in which the read-out state is set, and the period TZ in which the detection node is electrically separated from the vertical signal lines VLIN1 to VLINM after the elapse of the read-out state, in the vertical selection circuit 17 and the pulse selector circuit 18, circuits for an electronic shutter operation and a read-out operation can be shared. Accordingly, in the vertical selection circuit 17 and the pulse selector circuit 18, circuits for an electronic shutter operation and a read-out operation do not need to be separately configured, whereby the circuit scale can be decreased.

Figure 2:
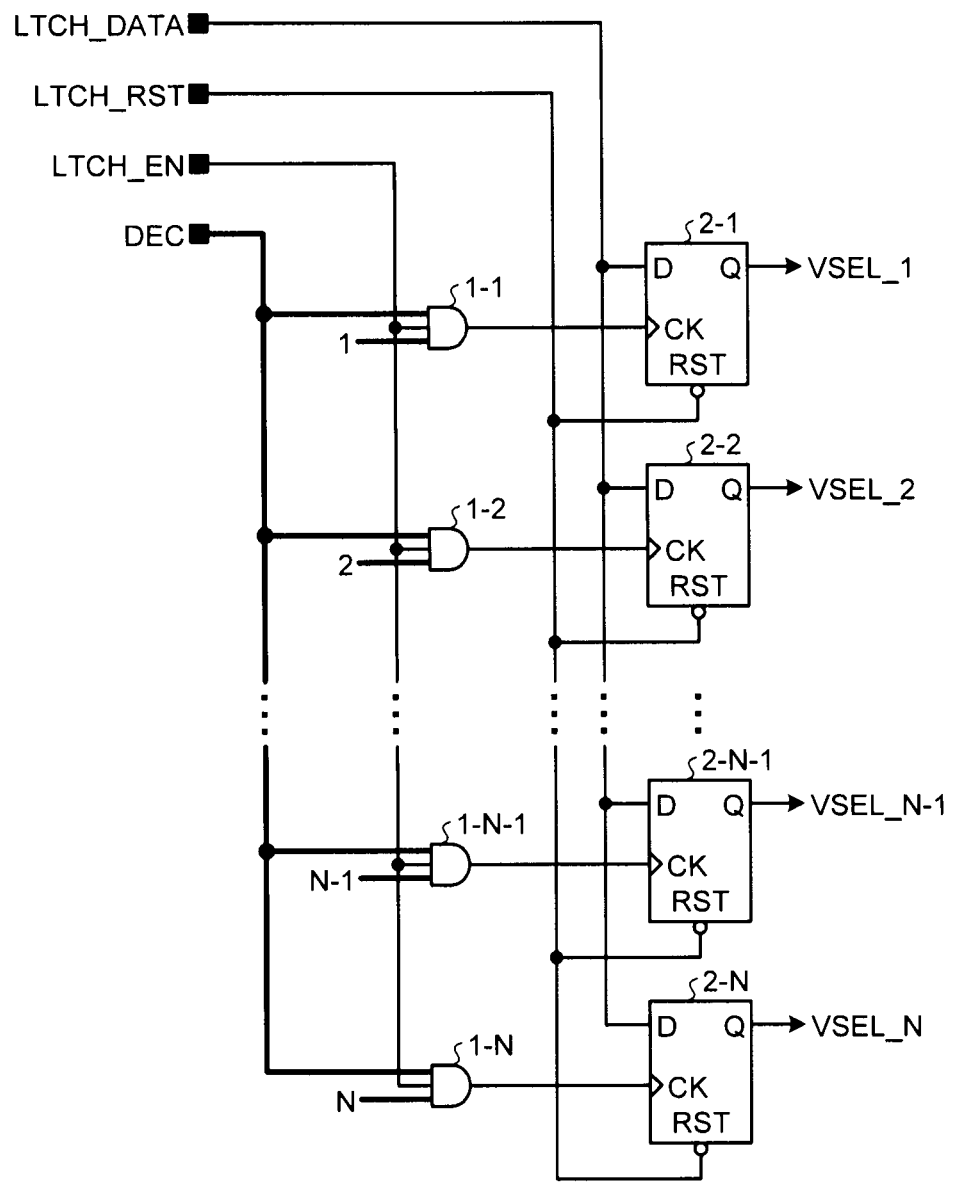
FIG. 2 is a circuit diagram illustrating a configuration example of a vertical selection circuit illustrated in FIG. 1.

FIG. 2 is a circuit diagram illustrating a configuration example of the vertical selection circuit illustrated in FIG. 1.

As illustrated in FIG. 2, in the vertical selection circuit 17, comparators 1-1 to 1-N that compare a row selection value DEC and row numbers 1 to N and registers 2-1 to 2-N that hold comparison results of the comparators 1-1 to 1-N are disposed in the rows. In the example illustrated in FIG. 2, a case is illustrated in which AND circuits are used as the comparators 1-1 to 1-N, and flip-flops are used as the registers 2-1 to 2-N. Here, the comparators 1-1 to 1-N and the registers 2-1 to 2-N are used commonly in the electronic shutter state and the read-out state.

The row selection value DEC is input to first input terminals of the comparators 1-1 to 1-N, row numbers 1 to N are input to second input terminals, and a latch enable signal LTCH_EN is input to latch enable terminals. In addition, latch data LTCH_DATA is input to data input terminals D of the registers 2-1 to 2-N, outputs of the comparators 1-1 to 1-N are input to clock terminals CK, a latch reset signal LTCH_RST is input to reset terminals RST, and row selection signals VSEL_1 to VSEL_N are output from data output terminals Q.

In addition, the row selection value DEC, the latch enable signal LTCH_EN, the latch reset signal LTCH_RST, and the latch data LTCH_DATA can be received from the timing generator circuit 19. Furthermore, while the latch data LTCH_DATA is provided so as to delicately turn on/off the pixel control signal, it is fixed to a logical value "1" in this embodiment.

Figure 3:
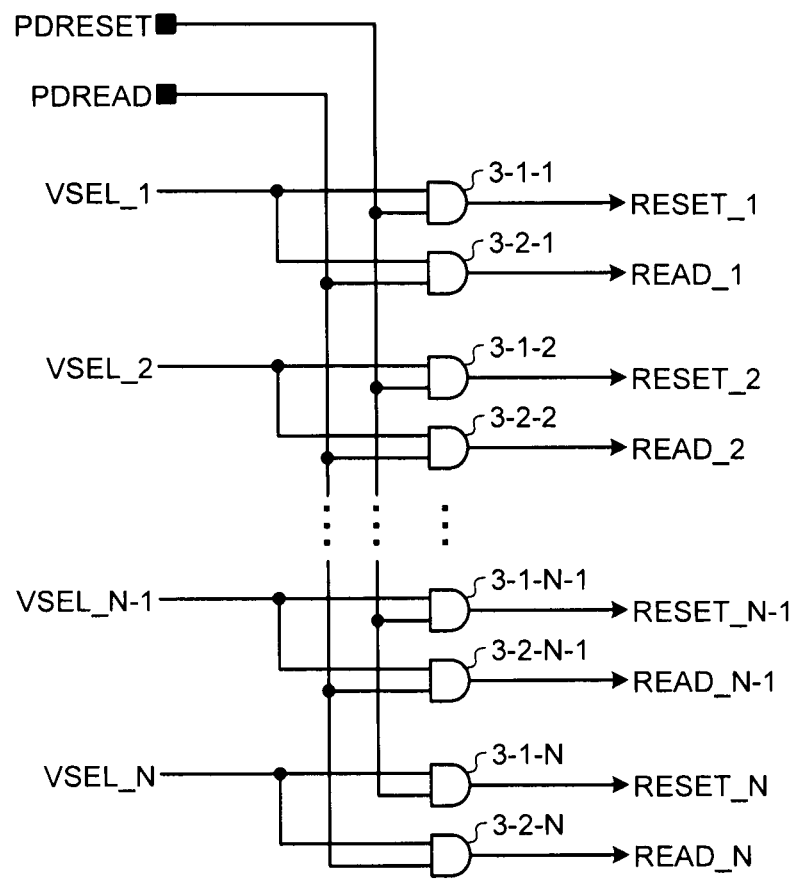
FIG. 3 is a circuit diagram illustrating a configuration example of a pulse selector circuit illustrated in FIG. 1.

FIG. 3 is a circuit diagram illustrating a configuration example of the pulse selector circuit illustrated in FIG. 1.

As illustrated in FIG. 3, in the pulse selector circuit 18, resetting AND circuits 3-1-1 to 3-1-N and reading AND circuits 3-2-1 to 3-2-N are disposed in the rows. Here, each one of the resetting AND circuits 3-1-1 to 3-1-N and each one of the reading AND circuits 3-2-1 to 3-2-N are used commonly in the electronic shutter state and the read-out state.

The row selection signals VSEL_1 to VSEL_N are output to first input terminals of the resetting AND circuits 3-1-1 to 3-1-N and the reading AND circuits 3-2-1 to 3-2-N, a reset instruction signal PDRESET is input to second input terminals of the resetting AND circuits 3-1-1 to 3-1-N, and a read-out instruction signal PDREAD is input to second input terminals of the reading AND circuits 3-2-1 to 3-2-N.

In addition, reset signals RESET_1 to RESET_N are output from the resetting AND circuits 3-1-1 to 3-1-N, and read signals READ_1 to READ_N are output from the reading AND circuits 3-2-1 to 3-2-N.

Furthermore, the reset instruction signal PDRESET and the read-out instruction signal PDREAD can be received from the timing generator circuit 19.

Figure 4:
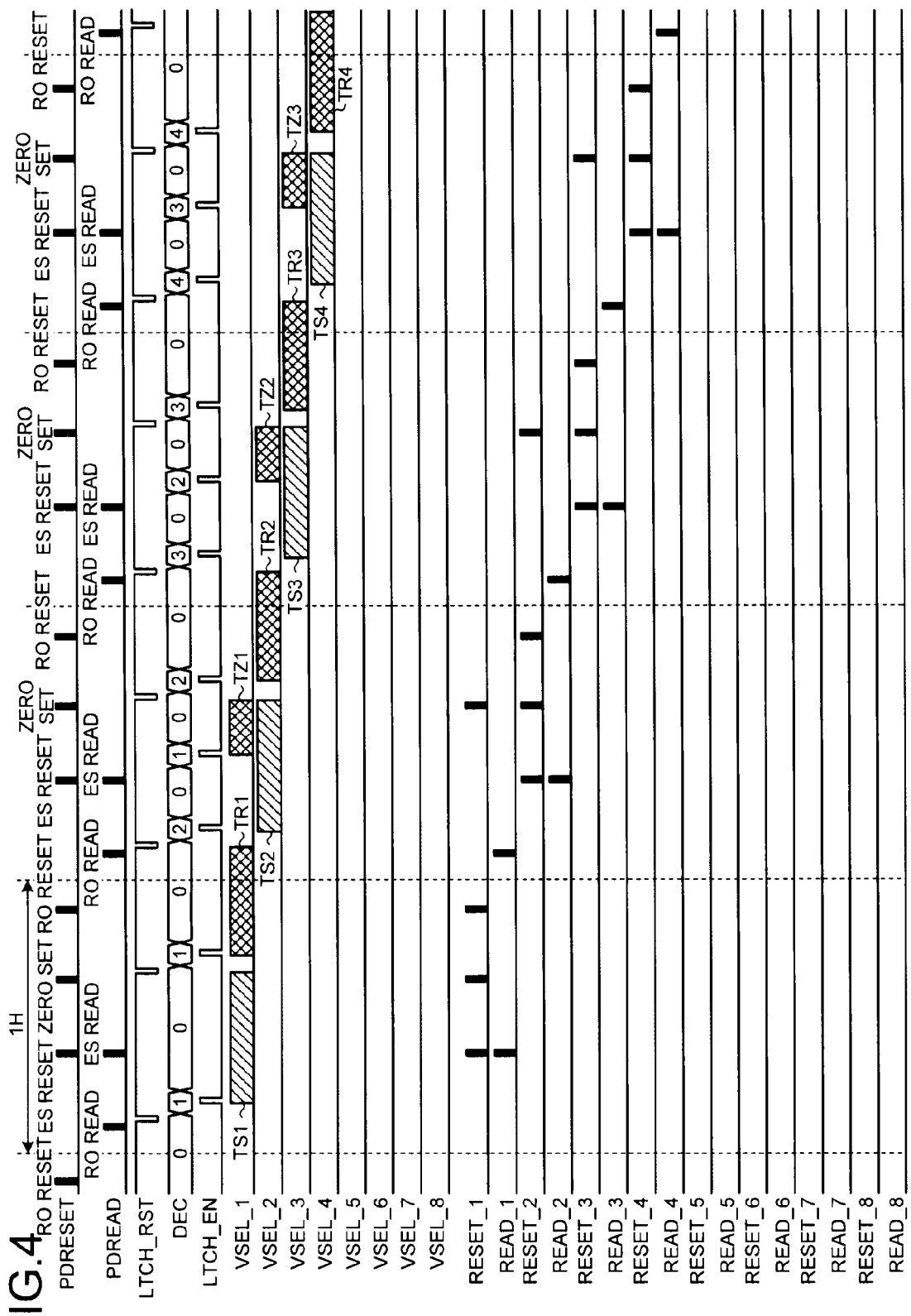
FIG. 4 is a timing chart illustrating an example of the operation of the solid-state imaging device illustrated in FIG. 1.

FIG. 4 is a timing chart illustrating an example of the operation of the solid-state imaging device illustrated in FIG. 1.

As illustrated in FIG. 4, for example, the period is divided into periods TS1, TR1, and TZ1 in the selected row L1, the period is divided into periods TS2, TR2, and TZ2 in the selected row L2, and the period is divided into periods TS3, TR3, and TZ3 in the selected row L3. In addition, the electronic shutter state is set in the periods TS1 to TS3, the read-out state is set in the periods TR1 to TR3, and a process of electrically separating the detection node from the vertical signal lines VLIN1 to VLINM is performed in the periods TZ1 to TZ3.

Then, when the latch enable signal LTCH_EN rises in a state in which the row selection value DEC is set to "1", the row selection value DEC and the row numbers 1 to N are compared with each other by the comparators 1-1 to 1-N illustrated in FIG. 2. As a result, the row selection value DEC and the row number 1 coincide with each other in the comparator 1-1, whereby the output of the comparator 1-1 rises. Accordingly, the output of the register 2-1 rises, the row selection signal VSEL_1 rises, and the process proceeds to the period TS1.

Then, in the period TS1, when an ES reset pulse as the reset instruction signal PDRESET is input to the resetting AND circuits 3-1-1 to 3-1-N, which are illustrated in FIG. 3, and an ES read pulse as the read-out instruction signal PDREAD is input to the reading AND circuits 3-2-1 to 3-2-N, which are illustrated in FIG. 3, the outputs of the resetting AND circuit 3-1-1 and the output of the reading AND circuit 3-2-1, which are selected by the row selection signal VSEL_1, rise. As a result, a reset signal RESET_1 is applied to the reset transistor Tb of the selected row L1, and a read-out signal READ_1 is applied to the read-out transistor Ta of the selected row L1. Consequently, the reset transistor Tb and the read-out transistor Ta of the selected row L1 are turned on, and the electric charge stored in the photodiode PD of the selected row L1 is discharged to the power source electric potential VDD through the floating diffusion FD.

Then, in the period TS1, when a zero setting pulse as the reset instruction signal PDRESET is input to the resetting AND circuits 3-1-1 to 3-1-Nr, which are illustrated in FIG. 3, the output of the resetting AND circuit 3-1-1, which is selected by the row selection signal VSEL_1, rises. As a result, a reset signal RESET_1 is applied to the reset transistor Tb of the selected row L1. At this time, the power source electric potential VDD is dropped to the ground electric potential once. Consequently, the electric potential of the floating diffusion FD is set to the ground electric potential through the reset transistor Tb of the selected row L1, whereby the amplifier transistor Tc is turned off.

Next, when the latch reset signal LTCH_RST falls, the outputs of the registers 2-1 to 2-N are reset. As a result, the output of the register 2-1 falls, the row selection signal VSEL_1 falls, and the period TS1 ends.

Then, when the latch enable signal LTCH_EN rises in a state in which the row selection value DEC is set to "1", the row selection value DEC and the row numbers 1 to N are compared with each other by the comparators 1-1 to 1-N illustrated in FIG. 2. As a result, the row selection value DEC and the row number 1 coincide with each other in the comparator 1-1, whereby the output of the comparator 1-1 rises. Accordingly, the output of the register 2-1 rises, the row selection signal VSEL_1 rises, and the process proceeds to the period TR1.

Then, in the period TR1, when an RO reset pulse as the reset instruction signal PDRESET is input to the AND circuits 3-1-1 to 3-1-N for resetting, which are illustrated in FIG. 3, the output of the resetting AND circuit 3-1-1, which is selected by the row selection signal VSEL_1, rises. As a result, a reset signal RESET_1 is applied to the reset transistor Tb of the selected row L1. Consequently, the reset transistor Tb of the selected row L1 is turned on, and the electric potential of the floating diffusion FD is set to the power source electric potential VDD. Then, the reset levels at that time are read out so as to be applied to the vertical signal lines VLIN1 to VLINM through the amplifier transistors Tc and are transmitted to the analog/digital conversion circuit 13 so as to be held.

Next, in the period TR1, when an RO read pulse as the read-out instruction signal PDREAD is input to the reading AND circuits 3-2-1 to 3-2-N, which are illustrated in FIG. 3, the output of the reading AND circuit 3-2-1, which is selected by the row selection signal VSEL_1, rises. As a result, a read-out signal READ_1 is applied to the read-out transistor Ta of the selected row L1. Consequently, the read-out transistor Ta of the selected row L1 is turned on, and the electric charge stored in the photodiode PD of the selected row L1 is read out and is transferred to the floating diffusion FD through the read-out transistor Ta. Then, the read-out levels at that time are read out so as to be applied to the vertical signal lines VLIN1 to VLINM through the amplifier transistors Tc and are transmitted to the analog/digital conversion circuit 13.

Next, when the latch reset signal LTCH_RST falls, the outputs of the registers 2-1 to 2-N are reset. As a result, the output of the register 2-1 falls, the row selection signal VSEL_1 falls, and the period TR1 ends.

Next, when the latch enable signal LTCH_EN rises in a state in which the row selection value DEC is set to "2", the row selection value DEC and the row numbers 1 to N are compared with each other by the comparators 1-1 to 1-N illustrated in FIG. 2. As a result, the row selection value DEC and the row number 2 coincide with each other in the comparator 1-2, whereby the output of the comparator 1-2 rises. Accordingly, the output of the register 2-2 rises, the row selection signal VSEL_2 rises, and the process proceeds to the period TS2.

Then, in the period TS2, when an ES reset pulse as the reset instruction signal PDRESET is input to the AND circuits 3-1-1 to 3-1-N for resetting, which are illustrated in FIG. 3, and an ES read pulse as the read-out instruction signal PDREAD is input to the reading AND circuits 3-2-1 to 3-2-N, which are illustrated in FIG. 3, the outputs of the resetting AND circuits 3-1-2 and the output of the reading AND circuit 3-2-2, which are selected by the row selection signal VSEL_2, rise. As a result, a reset signal RESET_2 is applied to the reset transistor Tb of the selected row L2, and a read-out signal READ_2 is applied to the read-out transistor Ta of the selected row L2. Consequently, the reset transistor Tb and the read-out transistor Ta of the selected row L2 are turned on, and the electric charge stored in the photodiode PD of the selected row L2 is discharged to the power source electric potential VDD through the floating diffusion FD.

Next, in the period TS2, when the latch enable signal LTCH_EN rises in a state in which the row selection value DEC is set to "1", the row selection value DEC and the row numbers 1 to N are compared with each other by the comparators 1-1 to 1-N illustrated in FIG. 2. As a result, the row selection value DEC and the row number 1 coincide with each other in the comparator 1-1, whereby the output of the comparator 1-1 rises. Accordingly, the output of the register 2-1 rises, the row selection signal VSEL_1 rises, and the process proceeds to the period TZ1 in the selected row L1.

Then, in the period TZ1 of the selected row L1 and the period TS2 of the selected row L2, when a zero setting pulse as the reset instruction signal PDRESET is input to the resetting AND circuits 3-1-1 to 3-1-N, which are illustrated in FIG. 3, the outputs of the resetting AND circuits 3-1-1 and 3-1-2, which are selected by the row selection signals VSEL_1 and VSEL_2, rise. As a result, reset signals RESET_1 and RESET_2 are applied to the reset transistors Tb of the selected rows L1 and L2. At this time, the power source electric potential VDD is dropped to the ground electric potential once. Consequently, the electric potential of the floating diffusion FD is set to the ground electric potential through the reset transistors Tb of the selected rows L1 and L2, whereby the amplifier transistor Tc is turned off.

Next, when the latch reset signal LTCH_RST falls, the outputs of the registers 2-1 to 2-N are reset. As a result, the outputs of the registers 2-1 and 2-2 fall, the row selection signals VSEL_1 and VSEL_2 fall, and the periods TZ1 and TS2 end.

Next, when the latch enable signal LTCH_EN rises in a state in which the row selection value DEC is set to "2", the row selection value DEC and the row numbers 1 to N are compared with each other by the comparators 1-1 to 1-N illustrated in FIG. 2. As a result, the row selection value DEC and the row number 2 coincide with each other in the comparator 1-2, whereby the output of the comparator 1-2 rises. Accordingly, the output of the register 2-2 rises, the row selection signal VSEL_2 rises, and the process proceeds to the period TR2.

Then, in the period TR2, when an RO reset pulse as the reset instruction signal PDRESET is input to the resetting AND circuits 3-1-1 to 3-1-N, which are illustrated in FIG. 3, the output of the resetting AND circuit 3-1-2, which is selected by the row selection signal VSEL_2, rises. As a result, a reset signal RESET_2 is applied to the reset transistor Tb of the selected row L2. Consequently, the reset transistor Tb of the selected row L2 is turned on, and the electric potential of the floating diffusion FD is set to the power source electric potential VDD. Then, the reset levels at that time are read out so as to be applied to the vertical signal lines VLIN1 to VLINM through the amplifier transistors Tc and are transmitted to the analog/digital conversion circuit 13 so as to be held.

Next, in the period TR2, when an RO read pulse as the read-out instruction signal PDREAD is input to the AND circuits 3-2-1 to 3-2-N for reading, which are illustrated in FIG. 3, the output of the reading AND circuit 3-2-2, which is selected by the row selection signal VSEL_2, rises. As a result, a read-out signal READ_1 is applied to the read-out transistor Ta of the selected row L2. Consequently, the read-out transistor Ta of the selected row L2 is turned on, and the electric charge stored in the photodiode PD of the selected row L2 is read out and is transferred to the floating diffusion FD through the read-out transistor Ta. Then, the read levels at that time are read out so as to be applied to the vertical signal lines VLIN1 to VLINM through the amplifier transistors Tc and are transmitted to the analog/digital conversion circuit 13.

Next, when the latch reset signal LTCH_RST falls, the outputs of the registers 2-1 to 2-N are reset. As a result, the output of the register 2-2 falls, the row selection signal VSEL_2 falls, and the period TR2 ends.

Next, when the latch enable signal LTCH_EN rises in a state in which the row selection value DEC is set to "3", the row selection value DEC and the row numbers 1 to N are compared with each other by the comparators 1-1 to 1-N illustrated in FIG. 2. As a result, the row selection value DEC and the row number 3 coincide with each other in the comparator 1-3, whereby the output of the comparator 1-3 rises. Accordingly, the output of the register 2-3 rises, the row selection signal VSEL_3 rises, and the process proceeds to the period TS3.

Then, in the period TS3, when an ES reset pulse as the reset instruction signal PDRESET is input to the resetting AND circuits 3-1-1 to 3-1-N, which are illustrated in FIG. 3, and an ES read pulse as the read-out instruction signal PDREAD is input to the reading AND circuits 3-2-1 to 3-2-N, which are illustrated in FIG. 3, the output of the resetting AND circuit 3-1-3 and the output of the reading AND circuit 3-2-3, which are selected by the row selection signal VSEL_3, rise. As a result, a reset signal RESET_3 is applied to the reset transistor Tb of the selected row L3, and a read-out signal READ_3 is applied to the read-out transistor Ta of the selected row L3. Consequently, the reset transistor Tb and the read-out transistor Ta of the selected row L3 are turned on, and the electric charge stored in the photodiode PD of the selected row L3 is discharged to the power source electric potential VDD through the floating diffusion FD.

Next, in the period TS3, when the latch enable signal LTCH_EN rises in a state in which the row selection value DEC is set to "2", the row selection value DEC and the row numbers 1 to N are compared with each other by the comparators 1-1 to 1-N illustrated in FIG. 2. As a result, the row selection value DEC and the row number 2 coincide with each other in the comparator 1-2, whereby the output of the comparator 1-2 rises. Accordingly, the output of the register 2-2 rises, the row selection signal VSEL_2 rises, and the process proceeds to the period TZ2 in the selected row L2.

Then, in the period TZ2 of the selected row L2 and the period TS3 of the selected row L3, when a zero setting pulse as the reset instruction signal PDRESET is input to the resetting AND circuits 3-1-1 to 3-1-N, which are illustrated in FIG. 3, the outputs of the resetting AND circuits 3-1-2 and 3-1-3, which are selected by the row selection signals VSEL_2 and VSEL_3, rise. As a result, reset signals RESET_2 and RESET_3 are applied to the reset transistors Tb of the selected rows L2 and L3. At this time, the power source electric potential VDD is dropped to the ground electric potential once. Consequently, the electric potential of the floating diffusion FD is set to the ground electric potential through the reset transistors Tb of the selected rows L2 and L3, whereby the amplifier transistor Tc is turned off.

Next, when the latch reset signal LTCH_RST falls, the outputs of the registers 2-1 to 2-N are reset. As a result, the outputs of the registers 2-2 and 2-3 fall, the row selection signals VSEL_2 and VSEL_3 fall, and the periods TZ2 and TS3 end. For the selected row 3 and after that, the operation performed for the selected row 2 can be similarly repeated.

Here, for example, by dividing the periods TS2 and TR2 in the selected row 2, the latch reset signal LTCH_RST can be input to the register 2-2 after the end of the period TS2. Accordingly, in order to end the period TZ1 before proceeding to the period TR2, even in a case where it is necessary for the latch reset signal LTCH_RST to be input to the register 2-1, the latch reset signal LTCH_RST can be shared between the registers 2-1 and 2-2.

In addition, for example, by dividing the periods TR2 and TZ2 in the selected row 2, the latch reset signal LTCH_RST can be input to the register 2-2 after the end of the period TR2. Accordingly, in order to end the period TR2 before proceeding to the period TS3, even in a case where it is necessary for the latch reset signal LTCH_RST to be input to the register 2-2, the latch reset signal LTCH_RST can be shared between the registers 2-2 and 2-3.

As a result, since the latch reset signal LTCH_RST does not need to be arranged separately for an electronic shutter operation and a read-out operation, in the vertical selection circuit 17 and the pulse selector circuit 18, the circuits for the electronic shutter operation and the read-out operation do not need to be separately configured, whereby the circuit scale can be decreased.

In addition, in the above-described embodiment, although a method has been described in which the row numbers 1 to N are sequentially selected, one end portion or the other end portion in the vertical direction may be skipped in the reading operation so as to cut out only a partial area, the reading sequence may be reversed, or the reading operation may be performed in an arbitrary sequence. Furthermore, the row numbers 1 to N in the vertical direction may be thinned out so as to be selected, and signals of a plurality of rows may be averaged at that time.

Figure 5:
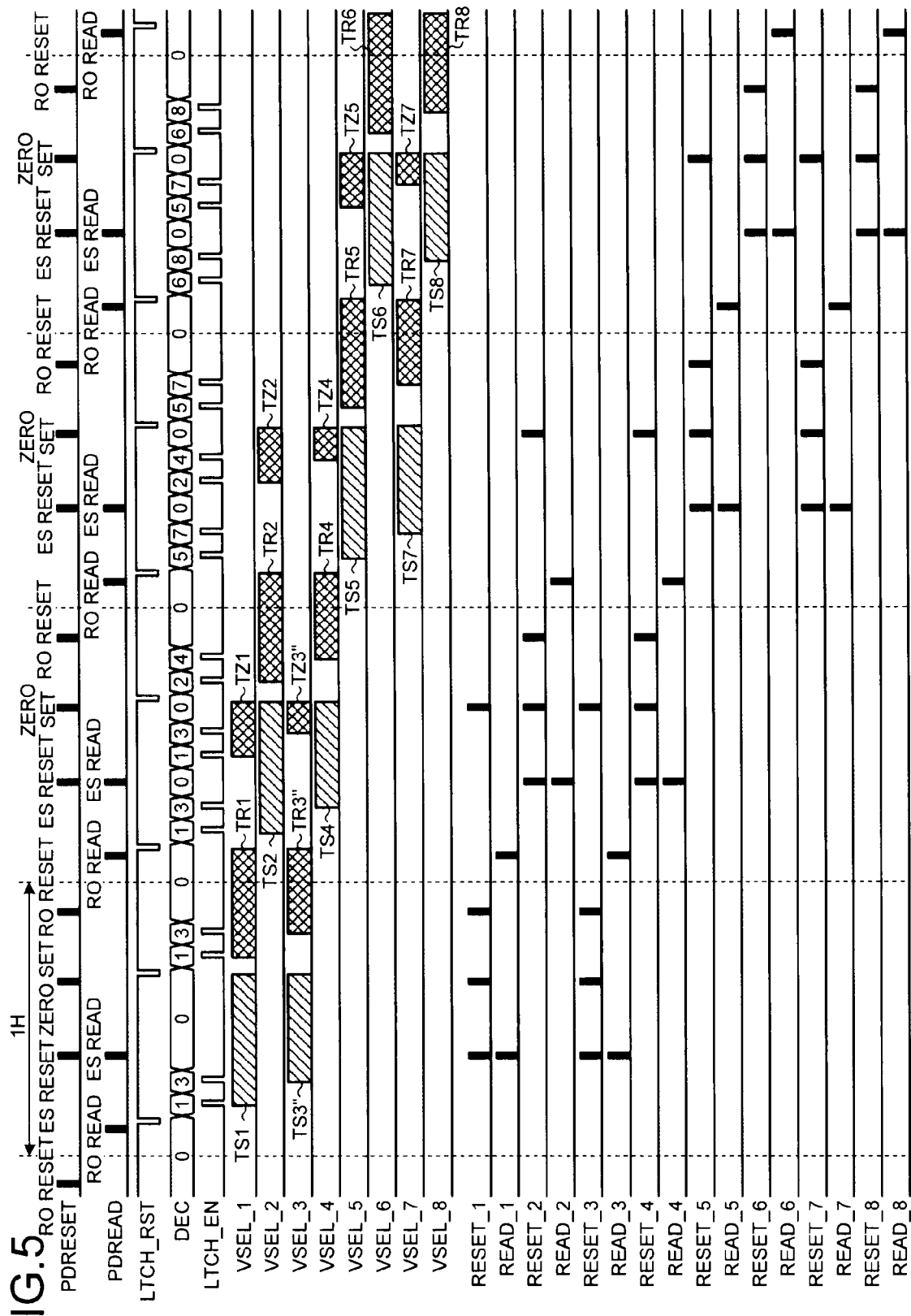
FIG. 5 is a timing chart illustrating another example of the operation of the solid-state imaging device illustrated in FIG. 1.

FIG. 5 is a timing chart illustrating another example of the operation of the solid-state imaging device illustrated in FIG. 1.

As illustrated in FIG. 5, for example, the period is divided into periods TS1, TR1, and TZ1 in the selected row L1, the period is divided into periods TS2, TR2, and TZ2 in the selected row L2, the period is divided into periods TS3", TR3", and TZ3" in the selected row L3, the period is divided into periods TS4, TR4, and TZ4 in the selected row L4, the period is divided into periods TS5, TR5, and TZ5 in the selected row L5, the period is divided into periods TS6, TR6, and TZ6 in the selected row L6, the period is divided into periods TS7, TR7, and TZ7 in the selected row L7, and the period is divided into periods TS8, TR8, and TZ8 in the selected row L8. In addition, the electronic shutter state is set in the periods TS1, TS2, TS3", and TS4 to TS8, the read-out state is set in the periods TR1, TR2, TR3", and TR4 to TR8, and a process of electrically separating the detection node from the vertical signal lines VLIN1 to VLINM is performed in the periods TZ1, TZ2, TZ3", and TZ4 to TZ8.

Here, in this operation, a reading operation is performed by thinning out each two rows in the vertical direction, and each two odd rows adjacent to each other are averaged, and each two even rows adjacent to each other are averaged.

For example, the periods TS3", TR3", and TZ3" are set so as to overlap the periods TS1, TR1, and TZ1, and the periods TS4, TR4, and TZ4 are set so as to overlap the periods TS2, TR2, and TZ2. In addition, the periods TS7, TR7, and TZ7 are set so as to overlap the periods TS5, TR5, and TZ5, and the periods TS8, TR8, and TZ8 are set so as to overlap the periods TS6, TR6, and TZ6.

Accordingly, even in a case where the circuits for the electronic shutter operation and the read-out operation are shared in the vertical selection circuit 17 and the pulse selector circuit 18, a reading operation can be performed through thinning out in the vertical direction, or signals of a plurality of rows can be averaged.

Second Embodiment

Figure 6:
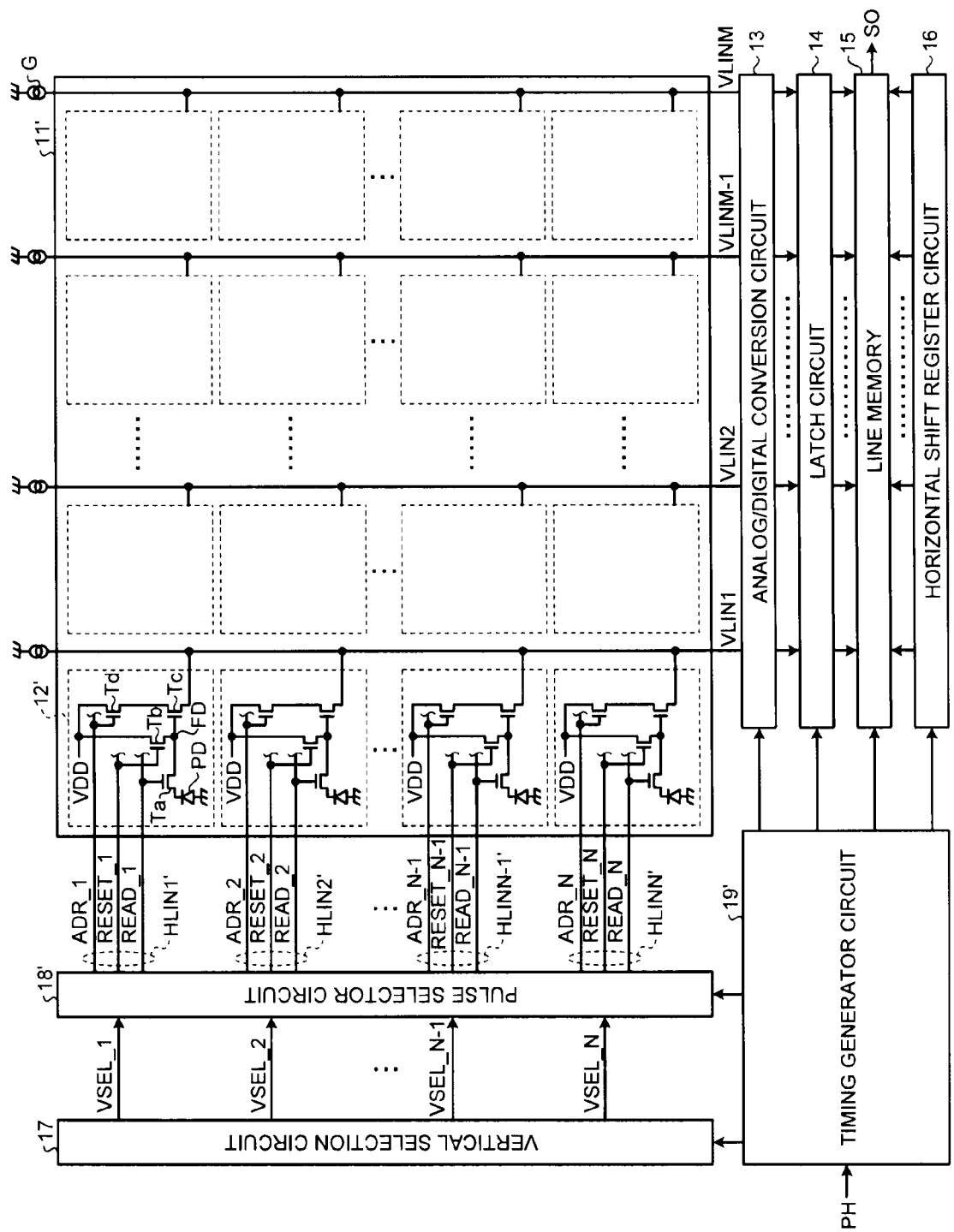
FIG. 6 is a block diagram illustrating a schematic configuration of a solid-state imaging device according to a second embodiment.

FIG. 6 is a block diagram illustrating a schematic configuration of a solid-state imaging device according to a second embodiment.

As illustrated in FIG. 6, in this solid-state imaging device, instead of the pixel array unit 11, the pulse selector circuit 18, and the timing generator circuit 19 of the solid-state imaging device illustrated in FIG. 1, a pixel array unit 11', a pulse selector circuit 18', and a timing generator circuit 19' are disposed.

In the pixel array unit 11', instead of the pixels 12, pixels 12' are disposed. In addition, in the pixel array unit 11', instead of the horizontal control lines HLIN1 to HLINN illustrated in FIG. 1, horizontal control lines HLIN1' to HLINN' are disposed. In addition, the horizontal control lines HLIN1' to HLINN' can transmit reset signals RESET_1 to RESET_N, read-out signals READ_1 to READ_N, and address signals ADR_1 to ADR_N to the pixels 12' for each row.

In the pixel 12', a row selecting transistor Td is added to the pixel 12. An address signal ADR_N is input to the gate of the row selecting transistor Td of the pixel 12' positioned in the N-th row, the drain of the row selecting transistor Td is connected to the power source electric potential VDD, and the source of the row selecting transistor Td is connected to the drain of the amplifier transistor Tc.

In the vertical selection circuit 17, a period TS' in which the electronic shutter state is set and a period TR' in which the read-out state is set are divided for each one of selected rows L1 to LN. In each one of the periods TS' and TR', row selection signals VSEL_1 to VSEL_N are respectively output from the vertical selection circuit 17 to the pulse selector circuit 18' in accordance with the selected rows L1 to LN.

Then, in the pulse selector circuit 18', in the period TS', reset signals RESET_1 to RESET_N are respectively applied to the reset transistors Tb in accordance with selected rows L1 to LN, and read-out signals READ_1 to READ_N are respectively applied to the read-out transistors Ta. As a result, the reset transistor Tb and the read-out transistor Ta are turned on, and the electric charge stored in the photodiode PD is discharged to the power source electric potential VDD through the floating diffusion FD.

In the period TR', the reset signals RESET_1 to RESET_N are respectively applied to the reset transistors Tb in accordance with selected rows L1 to LN. As a result, the reset transistor Tb is turned on, and the electric potential of the floating diffusion FD is set to the power source electric potential VDD through the reset transistor Tb. Then, when the address signals ADR_1 to ADR_N are applied to the row selection transistors Td in accordance with selected rows L1 to LN, the reset levels at that time are read out so as to be applied to the vertical signal lines VLIN1 to VLINM through the amplifier transistors Tc and are transmitted to the analog/digital conversion circuit 13 so as to be held.

In addition, in the period TR', the read-out signals READ_1 to READ_N are respectively applied to the read-out transistors Ta in the state in which the address signals ADR_1 to ADR_N are applied to the row selection transistors Td in accordance with selected rows L1 to LN. As a result, the read-out transistor Ta is turned on in a state in which the row selecting transistor Td is turned on, and the electric charge stored in the photodiode PD is transferred to the floating diffusion FD through the read-out transistor Ta. Then, the read-out levels at that time are read out so as to be applied to the vertical signal lines VLIN1 to VLINM through the amplifier transistors Tc and are transmitted to the analog/digital conversion circuit 13.

Then, in the analog/digital conversion circuit 13, by sampling the reset level and the read-out level from the signals of each pixel 12' and taking a difference between the reset level and the read-out level, the signal component of each pixel 12' is digitalized through CDS and is output as an output signal SO through the line memory 15.

Here, by performing time division multiplex of the period TS' in which the electronic shutter state is set and the period TR' in which the read-out state is set, in the vertical selection circuit 17 and the pulse selector circuit 18', circuits for an electronic shutter operation and a read-out operation can be shared. Accordingly, even in a case where the row selecting transistor Td is disposed in the pixel 12', in the vertical selection circuit 17 and the pulse selector circuit 18', circuits for an electronic shutter operation and a read-out operation do not need to be separately configured, whereby the circuit scale can be decreased.

Figure 7:
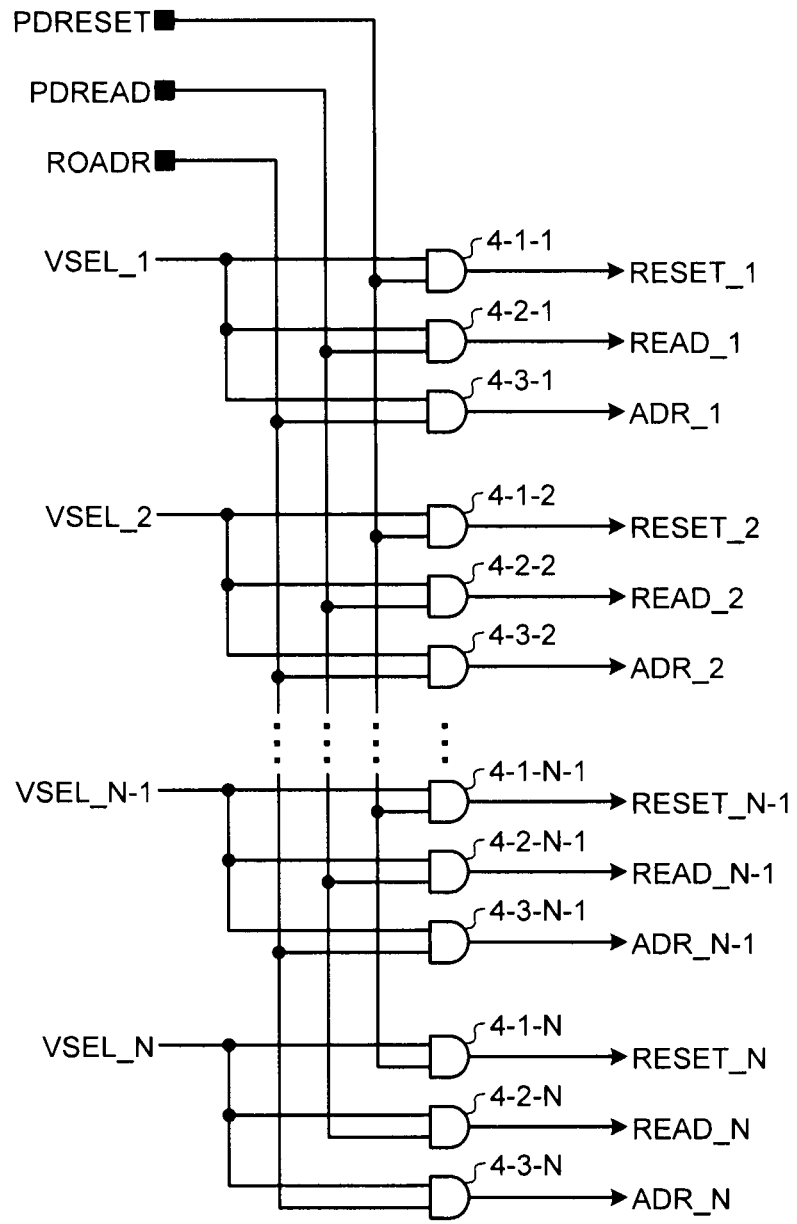
FIG. 7 is a circuit diagram illustrating a configuration example of a pulse selector circuit illustrated in FIG. 6.

FIG. 7 is a circuit diagram illustrating a configuration example of the pulse selector circuit illustrated in FIG. 6.

As illustrated in FIG. 7, in the pulse selector circuit 18', resetting AND circuits 4-1-1 to 4-1-N, reading AND circuits 4-2-1 to 4-2-N, and addressing AND circuits 4-3-1 to 4-3-N are disposed in the rows. Here, the resetting AND circuits 4-1-1 to 4-1-N, the reading AND circuits 4-2-1 to 4-2-N, and the addressing AND circuits 4-3-1 to 4-3-N are used commonly in the electronic shutter state and the read-out state.

Here, row selection signals VSEL_1 to VSEL_N are output to first input terminals of the resetting AND circuits 4-1-1 to 4-1-N, the reading AND circuits 4-2-1 to 4-2-N, and the addressing AND circuits 4-3-1 to 4-3-N, reset instruction signals PDRESET are input to second input terminals of the resetting AND circuits 4-1-1 to 4-1-N, read-out instruction signals PDREAD are input to second input terminals of the reading AND circuits 4-2-1 to 4-2-N, and row selection instruction signals ROADR are input to second input terminals of the addressing AND circuits 4-3-1 to 4-3-N.

In addition, reset signals RESET_1 to RESET_N are output from the resetting AND circuits 4-1-1 to 4-1-N, read signals READ_1 to READ_N are output from the reading AND circuits 4-2-1 to 4-2-N, and address signals ADR_1 to ADR_N are output from the addressing AND circuits 4-3-1 to 4-3-N.

Furthermore, the reset instruction signal PDRESET, the read-out instruction signal PDREAD, and the row selection instruction signal ROADR can be received from the timing generator circuit 19'.

Figure 8:
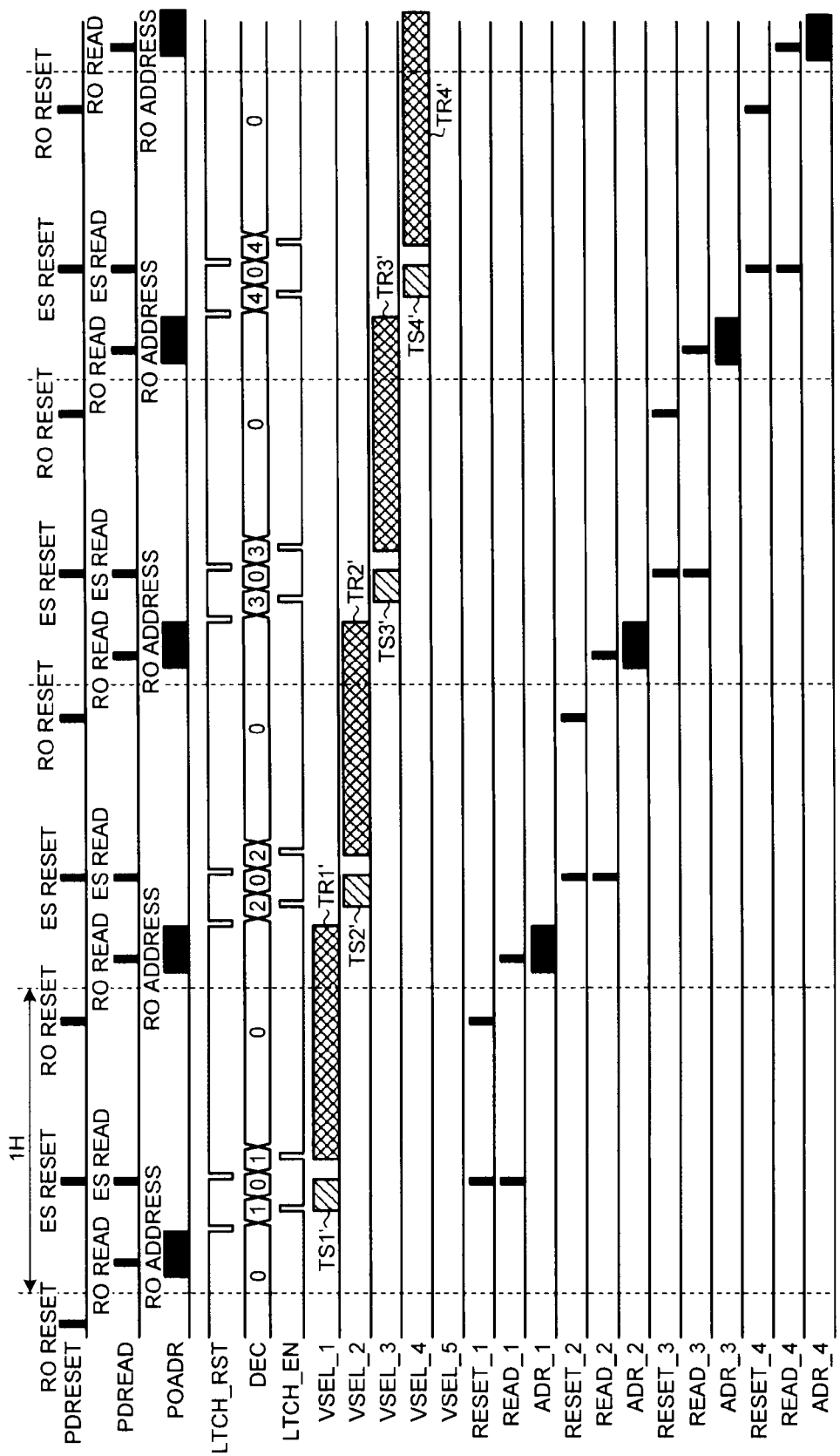
FIG. 8 is a timing chart illustrating an example of the operation of the solid-state imaging device illustrated in FIG. 6.

FIG. 8 is a timing chart illustrating an example of the operation of the solid-state imaging device illustrated in FIG. 6.

As illustrated in FIG. 8, for example, the period is divided into periods TS1' and TR1' in the selected row L1, the period is divided into periods TS2' and TR2' in the selected row L2, the period is divided into periods TS3' and TR3' in the selected row L3, and the period is divided into periods TS4' and TR4' in the selected row L4. In addition, the electronic shutter state is set in the periods TS1' to TS4', and the read-out state is set in the periods TR1' to TR4'.

Then, when the latch enable signal LTCH_EN rises in a state in which the row selection value DEC is set to "1", the row selection value DEC and the row numbers 1 to N are compared with each other by the comparators 1-1 to 1-N illustrated in FIG. 2. As a result, the row selection value DEC and the row number 1 coincide with each other in the comparator 1-1, whereby the output of the comparator 1-1 rises. Accordingly, the output of the register 2-1 rises, the row selection signal VSEL_1 rises, and the process proceeds to the period TS1'.

Then, in the period TS1', when an ES reset pulse as the reset instruction signal PDRESET is input to the resetting AND circuits 4-1-1 to 4-1-N, which are illustrated in FIG. 7, and an ES read pulse as the read-out instruction signal PDREAD is input to the reading AND circuits 4-2-1 to 4-2-N, which are illustrated in FIG. 7, the outputs of the resetting AND circuit 4-1-1 and the output of the reading AND circuit 4-2-1, which are selected by the row selection signal VSEL_1, rise. As a result, a reset signal RESET_1 is applied to the reset transistor Tb of the selected row L1, and a read-out signal READ_1 is applied to the read-out transistor Ta of the selected row L1. Consequently, the reset transistor Tb and the read-out transistor Ta of the selected row L1 are turned on, and the electric charge stored in the photodiode PD of the selected row L1 is discharged to the power source electric potential VDD through the floating diffusion FD.

Next, when the latch reset signal LTCH_RST falls, the outputs of the registers 2-1 to 2-N are reset. As a result, the output of the register 2-1 falls, the row selection signal VSEL_1 falls, and the period TS1' ends.

Then, when the latch enable signal LTCH_EN rises in a state in which the row selection value DEC is set to "1", the row selection value DEC and the row numbers 1 to N are compared with each other by the comparators 1-1 to 1-N illustrated in FIG. 2. As a result, the row selection value DEC and the row number 1 coincide with each other in the comparator 1-1, whereby the output of the comparator 1-1 rises. Accordingly, the output of the register 2-1 rises, the row selection signal VSEL_1 rises, and the process proceeds to the period TR1'.

Then, in the period TR1', when an RO reset pulse as the reset instruction signal PDRESET is input to the resetting AND circuits 4-1-1 to 4-1-N, which are illustrated in FIG. 7, the output of the resetting AND circuit 4-1-1, which is selected by the row selection signal VSEL_1, rises. As a result, a reset signal RESET_1 is applied to the reset transistor Tb of the selected row L1. Consequently, the reset transistor Tb of the selected row L1 is turned on, and the electric potential of the floating diffusion FD is set to the power source electric potential VDD.

Next, in the period TR1', when an RO address pulse as the row selection instruction signal ROADR is input to the addressing AND circuits 4-3-1 to 4-3-N, which are illustrated in FIG. 7, the output of the addressing AND circuit 4-3-1, which is selected by the row selection signal VSEL_1, rises. As a result, an address signal ADR_1 is applied to the row selecting transistor Td of the selected row L1. Consequently, the row selecting transistor Td of the selected row L1 is turned on, and the reset levels at that time are read out so as to be applied to the vertical signal lines VLIN1 to VLINM through the amplifier transistors Tc and are transmitted to the analog/digital conversion circuit 13 so as to be held.

Next, when an RO read pulse as the read-out instruction signal PDREAD is input to the AND circuits 4-2-1 to 4-2-N for reading, which are illustrated in FIG. 7, in a state in which the address signal ADR_1 is applied to the row selecting transistor Td of the selected row L1, the output of the reading AND circuit 4-2-1, which is selected by the row selection signal VSEL_1 rises. As a result, the read-out signal READ_1 is applied to the read-out transistor Ta of the selected row L1. Consequently, the read-out transistor Ta of the selected row L1 is turned on, and the electric charge stored in the photodiode PD of the selected row L1 is read out and is transferred to the floating diffusion FD through the read-out transistor Ta. Then, the read-out levels at that time are read out so as to be applied to the vertical signal lines VLIN1 to VLINM through the amplifier transistors Tc and are transmitted to the analog/digital conversion circuit 13.

Next, when the latch reset signal LTCH_RST falls, the outputs of the registers 2-1 to 2-N are reset. As a result, the output of the register 2-1 falls, the row selection signal VSEL_1 falls, and the period TR1' ends. For selected rows after the selected row 2, the operation performed for the selected row 2 can be similarly repeated.

In addition, in the embodiment described with reference to FIG. 8, although a method has been described in which the row numbers 1 to N are sequentially selected, one end portion or the other end portion in the vertical direction may be skipped in the reading operation so as to cut out only a partial area, the reading sequence may be reversed, or the reading operation may be performed in an arbitrary sequence. Furthermore, the row numbers 1 to N may be thinned out so as to be selected, and signals of a plurality of rows may be averaged at that time.

Here, even in a case where circuits for an electronic shutter operation and a read-out operation are shared in the vertical selection circuit 17 and the pulse selector circuit 18' by performing time division multiplex of the periods TS1' to TS4' in which the electronic shutter state is set and the periods TR1' to TR4' in which the read-out state is set for the selected rows L1 to L4, read-out of a pixel average can be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
    a pixel array unit in which pixels storing electric charge acquired through a photoelectric conversion are arranged in a matrix pattern;
    a vertical signal line that transmits pixel signals read out from the pixels in a vertical direction;
    a vertical selection circuit that sets an electronic shutter state and a read-out state for each selected row of the pixel array unit in time division multiplex;
    a pulse selector circuit that drives the pixels belonging to the selected row in accordance with the electronic shutter state and the read-out state; and
    a timing generator circuit that controls operational timing of the vertical selection circuit and the pulse selector circuit, wherein
    the vertical selection circuit includes:
    a comparator that is used commonly in the electronic shutter state and the read-out state and compares a row selection value and a row number; and
    a register that is used commonly in the electronic shutter state and the read-out state and holds a comparison result of the comparator, and wherein
    the vertical selection circuit performs time division multiplexing of a period in which the electronic shutter state is set and a period in which the read-out state is set.

2. The solid-state imaging device according to claim 1, wherein, in the pulse selector circuit, a driving circuit that drives the pixels in accordance with the electronic shutter state and a driving circuit that drives the pixels in accordance with the read-out state are commonly used.

3. The solid-state imaging device according to claim 2, wherein the pixel includes:
    a photodiode that performs photoelectric conversion;
    a detection node that detects a signal corresponding to electric charge stored in the photodiode;
    a read-out transistor that reads out the electric charge stored in the photodiode into the detection node;
    an amplifier transistor that amplifies the signal detected at the detection node; and
    a reset transistor that resets the detection node, and
    wherein the vertical selection circuit performs time division multiplexing of a period in which the detection node is electrically separated from the vertical signal line after an elapse of the read-out state.

4. The solid-state imaging device according to claim 3, wherein the comparator and the register are disposed for each row, and
    wherein the vertical selection circuit outputs a row selection signal corresponding to the selected row to the pulse selector circuit based on a comparison result of the comparator.

5. The solid-state imaging device according to claim 4, wherein the pulse selector circuit includes:
    a resetting AND circuit that is disposed for each row and outputs reset signals to the reset transistors based on the row selection signal; and
    a reading AND circuit that is disposed for each row and outputs read-out signals to the read-out transistors based on the row selection signal.

6. The solid-state imaging device according to claim 3, further comprising:
    an analog/digital conversion circuit that digitalizes a signal component read out from the pixel through CDS; and
    a horizontal shift register circuit that scans the pixels as read-out targets in a horizontal direction.

7. The solid-state imaging device according to claim 6, wherein, in a period in which the electronic shutter state of the first selected row is set, after the electric charge stored in the photodiode of the first selected row is discharged to a power source electric potential through a floating diffusion, an electric potential of the floating diffusion is set to the ground electric potential so as to turn off the amplifier transistor.

8. The solid-state imaging device according to claim 7, wherein, in the period in which the read-out state of the first selected row is set, the electric potential of the floating diffusion of the first selected row is set to the power source electric potential, reset levels at that time are read out through the amplifier transistors so as to be applied to the vertical signal lines and are transmitted to the analog/digital conversion circuit so as to be held, then, the electric charge stored in the photodiodes of the first selected row is transferred to the floating diffusion through the read-out transistors, and read-out levels at that time are read out so as to be applied to the vertical signal lines through the amplifier transistors and are transmitted to the analog/digital conversion circuit.

9. The solid-state imaging device according to claim 8, wherein, in a period in which the electronic shutter state of a second selected row is set, the electric charge stored in the photodiodes of the second selected row is discharged to the power source electric potential through the floating diffusion.

10. The solid-state imaging device according to claim 8, wherein, in a period in which the detection node is electrically separated from the vertical signal line after an elapse of the read-out state of the first selected row and the period in which the electronic shutter state of the second selected row is set, the electric potentials of the floating diffusions positioned in the first selected row and the second selected row are set to the ground electric potential so as to turn off the amplification transistors.

11. The solid-state imaging device according to claim 3, wherein reading is performed by thinning out each two rows in a vertical direction, two odd rows adjacent to each other are averaged, and two even rows adjacent to each other are averaged.

12. The solid-state imaging device according to claim 2, wherein the pixel includes:
    a photodiode that performs a photoelectric conversion;
    a detection node that detects a signal corresponding to electric charge stored in the photodiode;
    a read-out transistor that reads out the electric charge stored in the photodiode into the detection node;
    an amplifier transistor that amplifies the signal detected at the detection node;
    a reset transistor that resets the detection node; and
    a row selecting transistor that operates the amplifier transistors of the selected row.

13. The solid-state imaging device according to claim 12,
wherein the comparator and the register are disposed for
each row, and
wherein the vertical selection circuit outputs a row selection signal corresponding to a selected row to the pulse selector circuit based on a comparison result of the comparator.

14. The solid-state imaging device according to claim 13, wherein the pulse selector circuit includes:
a resetting AND circuit that is disposed for each row and outputs reset signals to the reset transistors based on the row selection signal;
a reading AND circuit that is disposed for each row and outputs read-out signals to the read-out transistors based on the row selection signal; and
an addressing AND circuit that is disposed for each row and outputs address signals to the row selecting transistors based on the row selection signal.

15. The solid-state imaging device according to claim 14, further comprising:
an analog/digital conversion circuit that digitalizes a signal component read out from the pixel through CDS; and
a horizontal shift register circuit that scans the pixels as read-out targets in a horizontal direction.

16. The solid-state imaging device according to claim 15, wherein, in the period in which the electronic shutter state is set, the electric charge stored in the photodiode is discharged to a power source electric potential through a floating diffusion.

17. The solid-state imaging device according to claim 16, wherein, in the period in which the read-out state row is set, the electric potential of the floating diffusion is set to the power source electric potential, reset levels at that time are read out through the amplifier transistors so as to be applied to the vertical signal lines and are transmitted to the analog/digital conversion circuit so as to be held, then, the electric charge stored in the photodiodes is transferred to the floating diffusion through the read-out transistors, and read-out levels at that time are read out so as to be applied to the vertical signal lines through the amplifier transistors and are transmitted to the analog/digital conversion circuit.

18. The solid-state imaging device according to claim 12, wherein reading is performed by thinning out each two rows in a vertical direction, two odd rows adjacent to each other are averaged, and two even rows adjacent to each other are averaged.

19. The solid-state imaging device according to claim 15, further comprising:
a latch circuit that latches a signal component of each pixel, which is digitalized by the analog/digital conversion circuit, corresponding to one line; and
a line memory that stores the signal component of each pixel, which is latched by the latch circuit, corresponding to one line.

* * * * *